United States Patent
Nagamoto (10) Patent No.: US 7,538,700 B2
(45) Date of Patent: May 26, 2009

(54) ANGULAR POSITION DETECTOR AND ROTARY ELECTRIC DEVICE DRIVE UNIT INCLUDING THE SAME

(75) Inventor: Makoto Nagamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 53 days.

(21) Appl. No.: 11/919,794

(22) PCT Filed: May 10, 2006

(86) PCT No.: PCT/IB2006/001221

§ 371 (c)(1), (2), (4) Date: Nov. 2, 2007

(87) PCT Pub. No.: WO2006/120547

PCT Pub. Date: Nov. 16, 2006

(65) Prior Publication Data

US 2009/0066324 A1    Mar. 12, 2009

(30) Foreign Application Priority Data

May 11, 2005    (JP)    ............................. 2005-138670

(51) Int. Cl.
H03M 1/48    (2006.01)
(52) U.S. Cl. .......................... 341/115; 341/112; 341/116
(58) Field of Classification Search .................. 341/112, 341/115, 116
See application file for complete search history.

(56) References Cited

U.S. PATENT DOCUMENTS

| 5,721,546 | A | 2/1998 | Tsutsumishita et al. | |
| 6,191,550 | B1 * | 2/2001 | Yoshihara | 318/661 |
| 6,556,153 | B1 | 4/2003 | Cardamone | |
| 6,707,401 | B2 * | 3/2004 | Kushihara | 341/116 |
| 7,388,527 | B2 * | 6/2008 | Kushihara | 341/114 |

FOREIGN PATENT DOCUMENTS

| EP | 0 803 968 A | 4/2003 |
| JP | 2001-086786 A | 3/2001 |
| JP | 2002-350180 A | 12/2002 |
| JP | 2004-012387 A | 1/2004 |

* cited by examiner

Primary Examiner—Khai M Nguyen
(74) Attorney, Agent, or Firm—Kenyon & Kenyon LLP

(57) ABSTRACT

The invention provides an angular position detector that can be configured at low cost and that accurately detects the angular position of a rotor in a rotary electric device and permits reliable control thereof even when the rotary electric device runs at a high speed. The angular position detector includes a resolver that outputs a signal indicating the rotational angle of the rotor and a signal processing circuit that calculates the rotational angle of the rotor based on the signal output from the resolver. The signal processing circuit samples output signals from the resolver at predetermined intervals and converts the signal into a digital signal. By calculating the angular speed according to the digital signal output from the resolver, the computation process is simpler, and can be performed using a microcomputer with less processing power, which reduces the component costs for the angular position detector.

6 Claims, 11 Drawing Sheets

ANGULAR POSITION DETECTOR AND ROTARY ELECTRIC DEVICE DRIVE UNIT INCLUDING THE SAME

This is a 371 national phase application of PCT/IB2006/001221 filed 10 May 2006, claiming priority to Japanese Patent Application No. 2005-138670 filed 11 May 2005, the contents of which are incorporated herein by reference.

BACKGROUND OF THE INVENTION

1. Field of the Invention

The invention relates generally to an angular position detector and a rotary electric device drive unit including the same. More specifically, the angular position detector of the invention can be configured at low cost, and can accurately detect the angular position of a rotor in a rotary electric device even when the rotary electric device runs at a high speed.

2. Description of the Related Art

Japanese Patent Application Publication No. JP-A-2001-86786, Japanese Patent Application Publication No. JP-A-07-79589, Japanese Patent Application Publication No. JP-A-2002-350180, and Japanese Patent Application Publication No. JP-A-2004-12387 describe motor drive units for driving a motor, where the angular position of a rotor is detected to facilitate the continuous rotation of the rotor in the motor within a rotating magnetic field. A resolver attached to the rotating shaft of the motor detects the angular position of the rotor.

Figure 13:
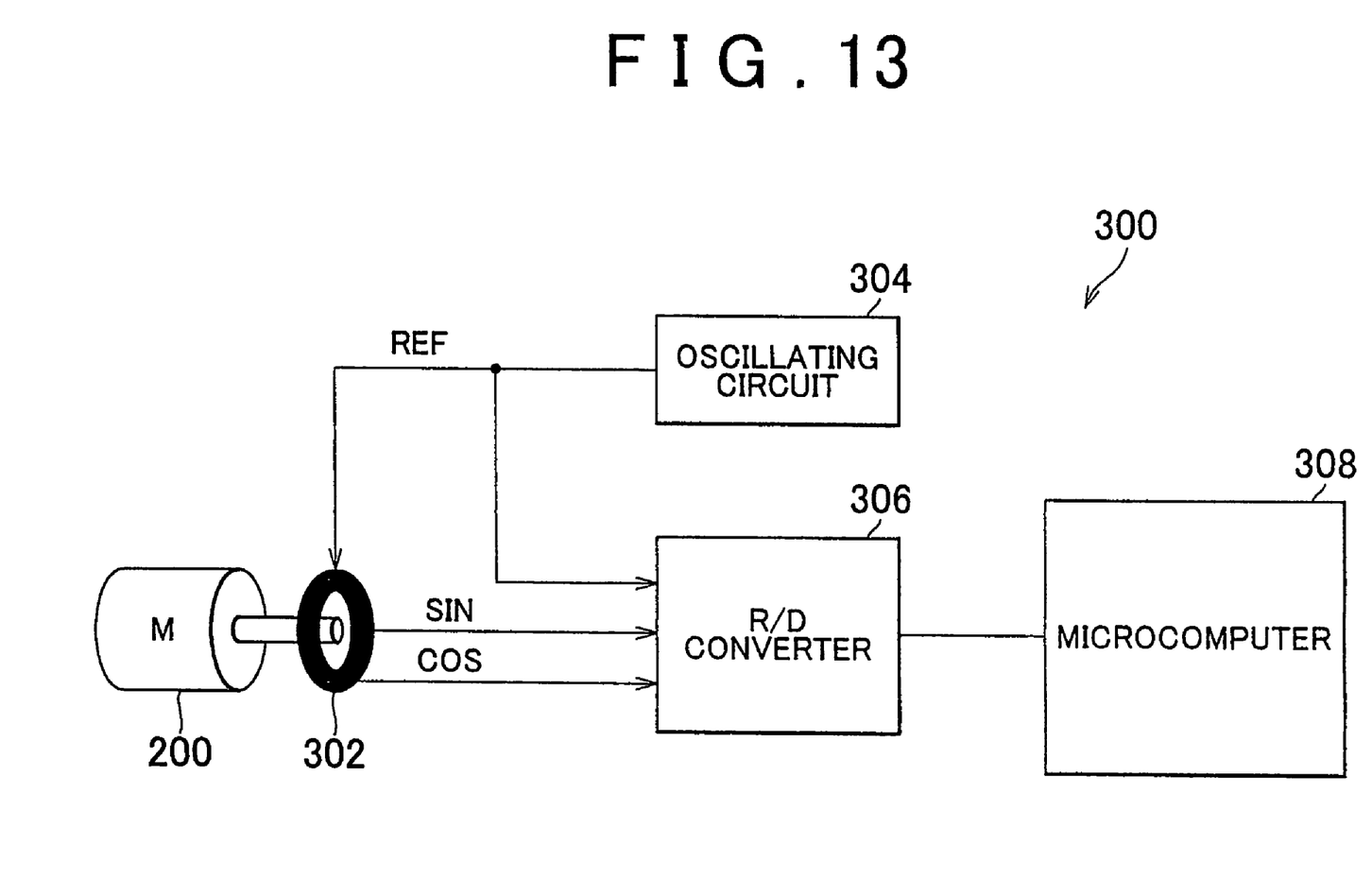
FIG. 13 illustrates the schematic block diagram of a conventionally used angular position detector.

FIG. 13 schematically illustrates the block diagram of a conventionally used angular position detector. As shown in FIG. 13, a resolver 302 detects the angular position of a rotor in a motor M, and transmits analog signals SIN and COS indicating the corresponding positions of the rotor to a R/D converter 306. The R/D converter 306 converts the analog signals SIN and COS transmitted from the resolver 302 into digital signals, and transmits the digital signals to a Central Processing Unit (CPU) of a microcomputer. Based on the digital signals received, the CPU produces a drive signal for supplying alternating current, used to produce a rotating magnetic field, to a stator coil provided on the periphery of the rotor. The CPU then transmits the drive signal to an inverter (not shown). The inverter supplies a predetermined alternating current to each phase of the stator coil at a predetermined time according to the drive signal transmitted from the CPU. Thus, the stator coil produces a rotating magnetic field, and the rotor rotates within the rotating magnetic field produced by the stator coil.

In this case, the R/D converter 306 is a dedicated integrated circuit (IC) with complex circuitry including a capacitor-resistor (CR) filter circuit which removes noise components from the signals SIN and COS. However, the inclusion of such circuitry in the R/D converter 306 greatly adds to the cost of the component, and consequently increases the total production cost of the motor drive unit.

However, such excessive costs can be avoided by using angular position detectors that include a microcomputer with a resolver interface integrated with a CPU, which functions as a R/D converter, instead of including a component as costly as an actual R/D converter.

For example, Japanese Patent Application Publication No. JP-A-2002-350180 describes a resolver signal processor which includes a resolver interface that converts signals from a resolver into digital signals; and a CPU that processes the digital signals indicating the rotational angle of the rotors. The resolver interface and the CPU are directly connected to each other through an internal bus.

Japanese Patent Application Publication No. JP-A-2004-12387 describes an angular position detector that is incorporated in an electric motor control device. The angular position detector also produces amplitude ratio signals TAN and COT based on signals SIN and COS transmitted from a resolver, and detects a rotational angle of a rotor based on the amplitude ratio signals TAN and COT.

With the technologies described above, the cost for producing the angular position detectors can be reduced, because R/D converters are not used. In addition, because the resolver interface and the CPU described in Japanese Patent Application Publication No. JP-A-2002-350180 are directly connected to each other, the resolver signal processor excellent in computing speed and noise immunity can be realized.

With the above-mentioned technologies, however, a large amount of sample data is needed to accurately detect the angular position of the rotor when the signals SIN and COS are converted into digital signals to accurately even through the noise present in the signals SIN and COS is removed. As a result, the processing load placed on the microcomputer increases due to the sheer quantity of sample data, which may cause delays in response that causes the detected rotational angle to deviate from the actual rotational angle.

Accordingly, the control means for the motor drive unit requires a microcomputer with high processing power. As the motor speed increases, the processing power required of the microcomputer also increases. Accordingly, when the motor runs at a relatively high speed, it is difficult to perform the above-mentioned computation for detecting the rotational angle due to the lack of sufficient processing power. As a result, use of the angular position detector is limited only to conditions where the motor runs at a relatively low speed, namely, where adequate processing power is available.

Meanwhile, because compact motors becoming increasingly prevalent due to growing demand, it is necessary for the motor drive units run the compact motors at a higher speed in order to achieve the same output. To meet such demands, the angular position detectors are required to detect the angular positions of the rotor even when the motor runs at a high speed.

To fulfill such a requirement, employing a microcomputer with greater processing power as the control means may be effective. However, using a microcomputer with greater processing power also increases the total cost for producing the angular position detectors.

SUMMARY OF THE INVENTION

The invention is made in light of the above circumstances. It is, therefore, an object of the invention to provide an angular position detector that can be configured at low cost, and that accurately detects the angular position of a rotor in a rotary electric device even when the rotary electric device runs at a high speed.

It is another object of the invention to provide a rotary electric device drive unit that can be configured at low cost, and that can reliably control a rotary electric device even when the rotary electric device runs at a high speed.

A first aspect of the invention relates to an angular position detector that detects the angular position of a rotor within a rotary electric device. The angular position detector includes a resolver that outputs a signal indicating the rotational angle of the rotor, and a signal processing circuit that calculates the rotational angle of the rotor based on the signal output from the resolver. The signal processing circuit then outputs a signal indicating the rotational angle. The signal processing circuit includes sampling means for sampling the signal output from the resolver at predetermined intervals, and converting the signal into a digital signal. The signal processing circuit also includes absolute angle calculation means for calculating an instantaneous value of the rotational angle at sampling time, at which the signal output from the resolver is sampled, based on the digital signal. An angular speed calculation means for calculating an angular speed at the sampling time based on the instantaneous value of the rotational angle. A rotational angle calculation means for converting the angular speed into a temporal change in the rotational angle and calculating the rotational angle at the sampling time, which accurately matches the actual rotational angle that changes with time.

According to the first aspect of the invention, the rotational angle, which accurately matches the actual rotational angle that changes with time, is detected based on the angular speed calculated according to the digital signal output from the resolver. Accordingly, the computation process is simpler than that in a conventional angular position detector, because the R/D converter is not required. This also reduces the load placed on the microcomputer. As a result, the angular position detector can be configured at low cost, and can detect the angular position of the rotor even when the rotary electric device runs at a high speed.

In the first aspect of the invention, the rotational angle calculation means may feed the rotational angle at the sampling time back to the angular speed calculation means, the angular speed calculation means may calculate the angular speed at the sampling time based on the feed back rotational angle at the sampling time and the instantaneous value of the rotational angle; and the signal processing circuit may further include a delay correcting means for accurately calculating the rotational angle at the sampling time by correcting a delay in output of the rotational angle that occurs due to the feedback.

With this configuration, because the delay in the output of the rotational angle due to the feedback can be easily corrected using the calculated angular speed, the response of the angular position detector can be enhanced without increasing the load placed on the microcomputer.

In the first aspect, the delay correcting means may store a predicted magnitude of delay due to the feedback as a delay correction constant, and may add a corrected angle, calculated based on the delay correction constant and the angular speed at the sampling time, to the rotational angle at the sampling time.

The rotational angle is corrected using the corrected angle calculated based on the angular speed and the delay correction constant. Accordingly, it is not necessary to enhance the response by increasing the gain and introducing the derivative term to enable the feedback circuit to operate stably.

In the first aspect, the signal processing circuit may further include interpolation means for interpolating the rotational angle at a given time between the rotational angles at consecutive sampling times using the angular speed at the sampling time, and outputting the interpolated rotational angle.

With this configuration, the angular position of the rotor can be detected at appropriate times without increasing the load placed on the microcomputer that would be caused by an increase in the frequency of the sampling performed by the sampling means.

In the first aspect of the invention, the interpolation means may interpolate the rotational angle at the given time between the rotational angles at consecutive sampling times using the angular speed calculated by the angular speed calculation means as the angular speed at the sampling time, and output the interpolated rotational angle.

By interpolating the rotational angle at the given time between the rotational angles at consecutive sampling times using the angular speed obtained by the angular speed calculation means, increases in the load placed on the microcomputer can be suppressed, and the cost for producing the angular position detector can be reduced.

A second aspect of the invention relates to a rotary electric device drive unit which includes a power supply; a drive circuit that drives a rotary electric device using electric power supplied from the power supply; and a control unit that includes the angular position detector according to the invention. The control unit also controls the drive circuit based on an angular position of a rotor in the rotary electric device.

According to the second aspect of the invention, because less processing power is required for detecting the angular position, the rotary electric device control unit can be configured at low cost. In addition, the rotary electric device control unit is also better able to reliably control the rotary electric device even when the rotary electric device runs at a high speed.

According to the invention, it is possible to provide the angular position detector that can be configured at low cost and that can accurately detect the angular position of the rotor in the rotary electric device even when the rotary electric device runs at a high speed. As such, a rotary electric device control unit including the angular position detector according to the invention can also be configured at low cost and can reliably control the rotary electric device even when the rotary electric device runs at a high speed. The invention, therefore, realizes both a reduction in the production cost of the device and reliable control of the rotary electric device.

BRIEF DESCRIPTION OF THE DRAWINGS

The features, advantages, thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Hereafter, an embodiment of the invention will be described in detail with reference to accompanying drawings. The same or corresponding portions will be denoted by the same reference numerals.

Figure 1:
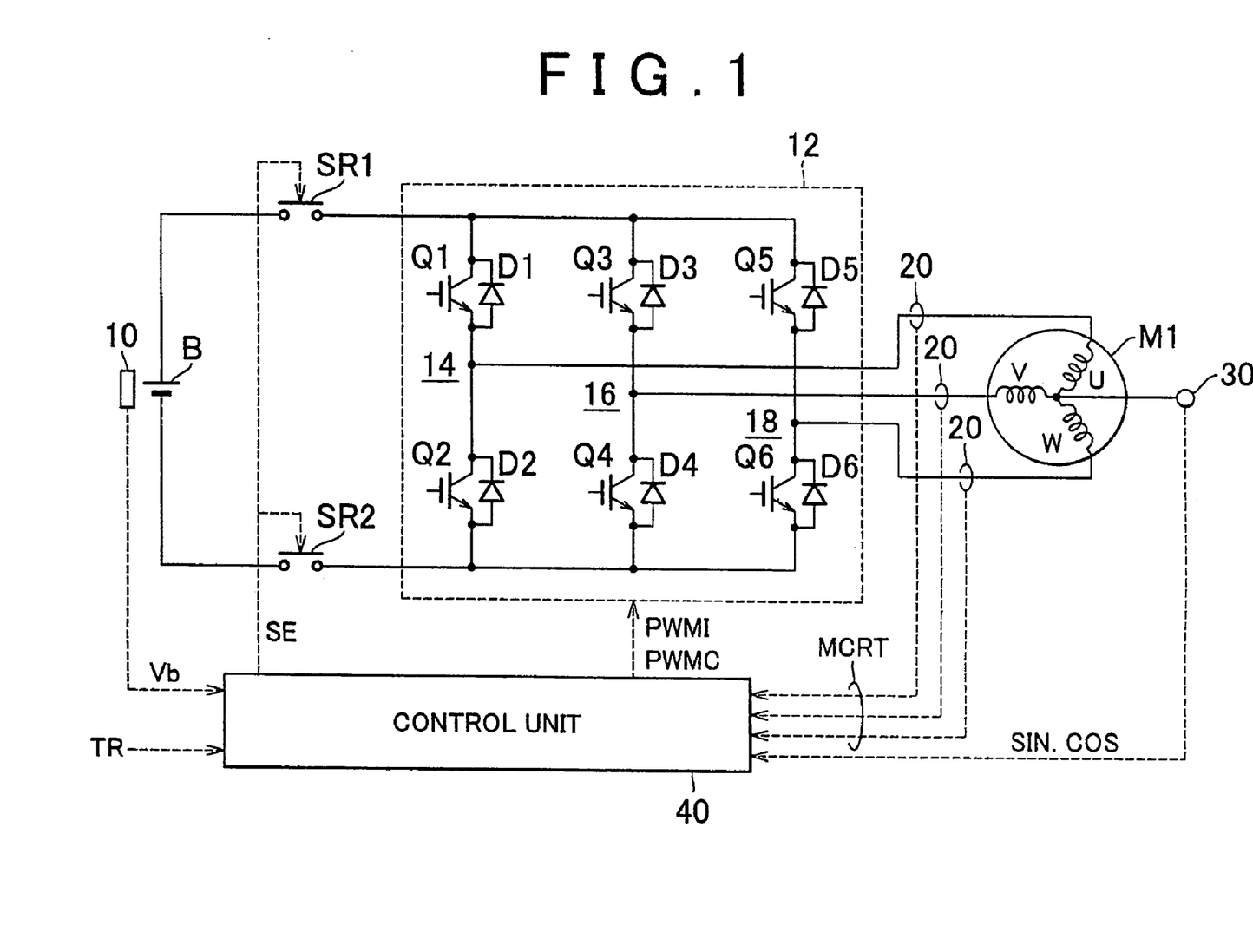
FIG. 1 illustrates the schematic block diagram of a motor drive unit including an angular position detector according to an embodiment of the invention.

FIG. 1 illustrates the schematic block diagram of a motor drive unit including an angular position detector according to the embodiment of the invention.

As shown in FIG. 1, the motor drive unit includes a direct-current power supply (hereinafter, referred to as a "DC power supply") B, a voltage sensor 10, an inverter 12, a current sensor 20, a resolver 30, and a control unit 40.

An alternating-current motor (hereinafter, referred to as an "AC motor") M1 is provided to drive the drive wheels of a hybrid vehicle or an electric vehicle. The AC motor M1 may function as an electric power generator driven by an engine, or as an electric motor for the engine. For example, the AC motor M1 can be used to start the engine.

The inverter 12 includes a U-phase arm 14, a V-phase arm 16, and a W-phase arm 18. The U-phase arm 12, the V-phase arm 16, and the W-phase arm 18 are arranged in parallel with each other between a power supply line and a ground line.

The U-phase arm 14 includes NPN transistors Q1 and Q2 that are connected in series. The V-phase arm 16 includes NPN transistors Q3 and Q4 that are connected in series. The W-phase arm 18 includes NPN transistors Q5 and Q6 that are connected in series. Diodes D1, D2, D3, D4, D5 and D6, which pass electric currents from the emitter side to the collector side, are provided between the collectors and the emitters of the NPN transistors Q1, Q2, Q3, Q4, Q5 and Q6, respectively.

The central points of the U-phase arm 14, the V-phase arm 16, and the W-phase arm 18 are connected to the ends of an U-phase coil, a V-phase coil, and a W-phase coil of the AC motor M1, respectively. Namely, the AC motor M1 is a three-phase permanent magnet motor, where the one ends of the U-phase coil, the V-phase coil and the W-phase coil meet at the central point of the motor M1. The other end of the U-phase coil is connected to the central point of the line connecting the NPN transistors Q1 and Q2. The other end of the V-phase coil is connected to the central point of the line connecting the NPN transistors Q3 and Q4. The other end of the U-phase coil is connected to the central point of the line connecting the NPN transistors Q5 and Q6.

The DC power supply B is a secondary battery such as a nickel hydride battery or a lithium ion battery. The voltage sensor 10 detects a voltage Vb output from the DC power supply B, and transmits a signal indicating the detected voltage Vb to the control unit 40.

System relays SR1 and SR2 are turned on or off according to a signal SE transmitted from the control unit 40.

When supplied with a direct-current voltage (hereinafter, referred to as a "DC voltage") from the DC power supply B, the inverter 12 converts the DC voltage to an alternating-current voltage (hereinafter, referred to as an "AC voltage") according to a signal PWMI transmitted from the control unit 40, thereby driving the AC motor M1. Thus, the AC motor M1 is driven to generate torque corresponding to a torque command value TR.

Also, when a regenerative braking operation is performed in a hybrid vehicle or an electric vehicle including the motor drive unit, the inverter 12 converts an AC voltage supplied from the AC motor M1 into a DC voltage based on a signal PWMC transmitted from the control unit 40. The inverter 12 then supplies the DC voltage to the DC power supply B.

In a "regenerative braking operation", the braking or deceleration of the vehicle results in the generation of electric power. The regenerative braking operation may be initiated when the driver of the hybrid vehicle or the electric vehicle steps on the brakes. Alternatively, the regenerative braking operation may be initiated when the driver reduces the speed or terminates acceleration of the vehicle.

The current sensor 20 detects a motor current MCRT passing through the AC motor M1, and transmits a signal indicating the motor current MCRT to the control unit 40.

The resolver 30 is attached to the rotating shaft of the AC motor M1, and transmits signals SIN and COS each corresponding to the rotational angle θ of the rotor in the AC motor M1 to the control unit 40. More specifically, the resolver 30 includes a rotator attached to the rotating shaft of the AC motor M1, an exciting coil (not shown) provided around the rotator, and two secondary coils (not shown). When a reference signal REF is transmitted to the exciting coil from the control unit 40, the resolver 30 outputs the signals SIN and COS, where the amplitudes have been modulated, induced by the two respective secondary coils.

The control unit 40 receives signals indicating a torque command value TR and a motor speed MRN from an external ECU (Electronic Control Unit). The control unit 40 also receives signals indicating a voltage Vm from the current sensor 10 and signals indicating the motor current MCRT from the current sensor 20 as well as the signals SIN and COS from the resolver 30.

The control unit 40 calculates the rotational angle θ of the rotor based on the signals SIN and COS transmitted from the resolver 30. The control unit 40 then produces the signal PWMI for driving the NPN transistors Q1 to Q6 of the inverter 12, using the rotational angle θ, the torque command value TR and the motor current MCRT, and transmits the signal PWMI to the inverter 12.

In addition, when a regenerative braking operation occurs, the control unit 40 produces the signal PWMC for converting the AC voltage supplied from the AC motor M1 into DC voltage based on the rotational angle θ, the torque command value TR and the motor current MCRT, and transmits the signal PWMC to the inverter 12. In this case, the ON/OFF states of the NPN transistors Q1 to Q6 of the inverter 12 are controlled based on the signal PWMC. Thus, the inverter 12 converts the AC voltage supplied from the AC motor M1 into DC voltage, and supplies the DC voltage to the DC power supply B.

Figure 2:
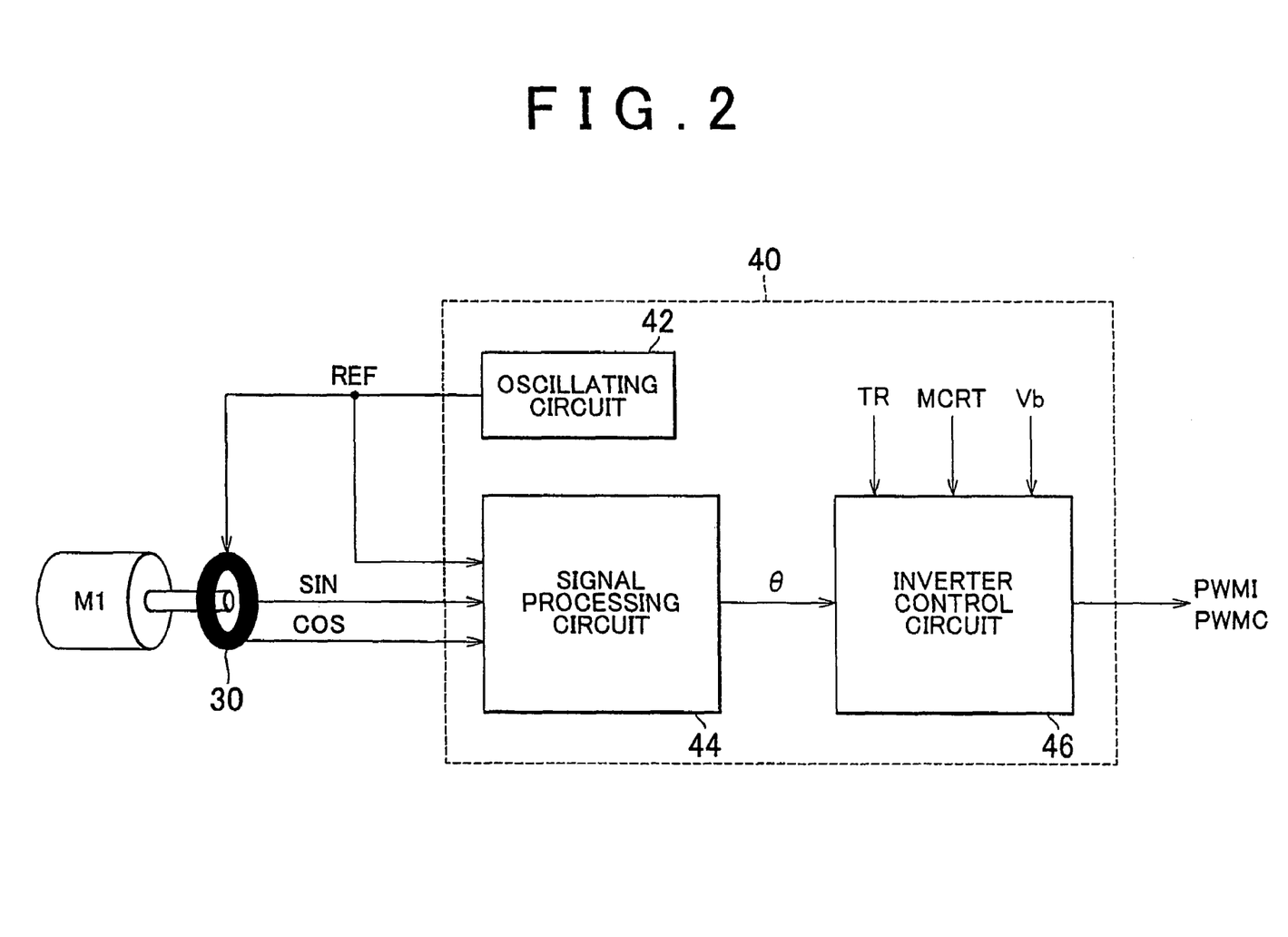
FIG. 2 illustrates the control block diagram of a control unit in FIG. 1.

FIG. 2 illustrates the control block diagram of the control unit 40 in FIG. 1. As shown in FIG. 2, the control unit 40 includes an oscillating circuit 42, a signal processing circuit 44, and an inverter control circuit 46.

The oscillating circuit 42 produces the reference signal REF indicating a sine voltage having a predetermined frequency, and transmits the reference signal REF to the exciting coil (not shown) of the resolver 30. In each of the two secondary coils (not shown) of the resolver 30, an induction voltage corresponding to the distance to the rotator is generated. At this time, the signal SIN where the amplitude is modulated into a sine-wave is induced in the first secondary coil. Also, the signal COS where the amplitude is modulated into a cosine-wave is induced in the second secondary coil. The resolver 30 then transmits the induced signals SIN and COS to the signal processing circuit 44 of the control unit 40. In the description below, the signals SIN and COS may also be collectively referred to as amplitude modulation signals.

When receiving the amplitude modulation signals SIN and COS, the signal processing circuit 44 detects the rotational angle θ of the rotor according to a method described below, and transmits the rotational angle θ to the inverter control circuit 46. As shown in FIG. 2, the resolver 30, the oscillating circuit 42, and the signal processing circuit 44 constitute the "angular position detector" according to the invention.

The inverter control circuit 46 receives i) signals indicating the rotational angle θ from the signal processing circuit 44, ii) signals indicating the torque command value TR from the external ECU, iii) signals indicating the voltage Vb from the voltage sensor 10, and iv) signals indicating the motor current MCRT from the current sensor 20. Based on the rotational angle θ, the torque command value TR, and the motor current MCRT, the inverter control circuit 46 produces the signal PWMI for turning on or off the NPN transistors Q1 to Q6 of the inverter 12 when the AC motor M1 is driven. The inverter control circuit 46 then transmits the signal PWMI to the inverter 12.

Also, during the regenerative braking operation in the hybrid vehicle or the electric vehicle including the motor drive unit, the inverter control circuit 46 produces the signal PWMC for converting the AC voltage supplied from the AC motor M1 into the DC voltage based on the rotational angle θ, the torque command value TR and the motor current MCRT. The inverter control circuit 46 then transmits the signal PWMC to the inverter 12.

Figure 3:
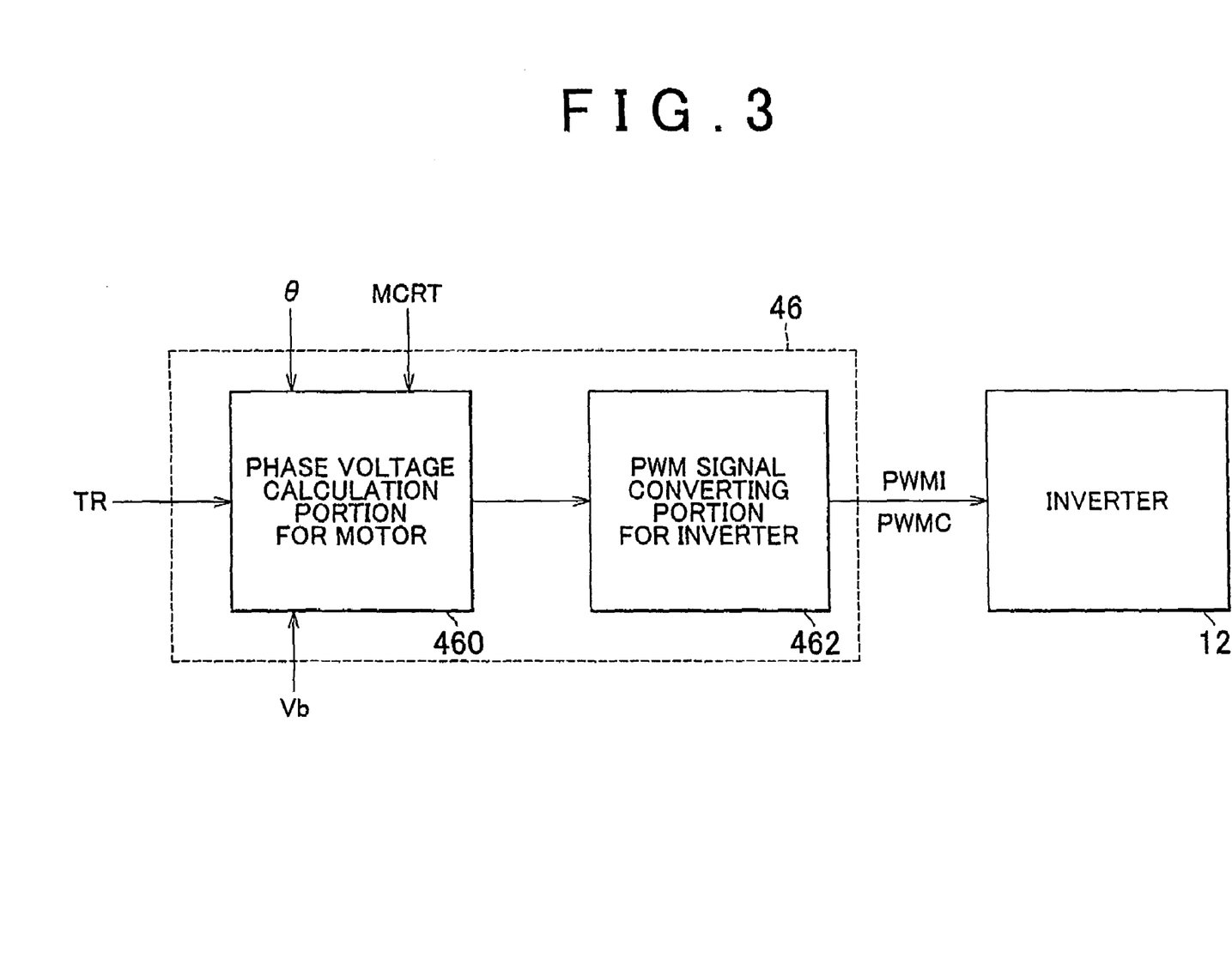
FIG. 3 illustrates the block diagram of an inverter control circuit included in the control unit in FIG. 2.

FIG. 3 illustrates the block diagram of the inverter control circuit 46 included in the control unit 40 in FIG. 2. As shown in FIG. 2, the inverter control circuit 46 includes a phase voltage calculation portion 460 for controlling a motor, and a PWM signal-producing portion 462 for an inverter.

The phase voltage calculation portion 460 receives i) signals indicating the input voltage Vb of the inverter 12 from the voltage sensor 10, ii) signals indicating the motor currents MCRT passing through the respective phases of the AC motor M1 from the current sensor 20, and iii) signals indicating the torque command value TR from the external ECU. The phase voltage calculation portion 460 then produces signals indicating the manipulated variables Vu*, Vv*, and Vw* of the voltages applied to the respective phases of the AC motor M1 based on these input signals, and transmits the signals to the PWM signal-producing portion 462.

The PWM signal-producing portion 462 produces the signals PWMI and PWMC for actually turning on or off the NPN transistors Q1 to Q6 of the inverter 12 based on the received manipulated variables Vu*, Vv*, and Vw* of the voltages. The PWM signal-producing portion 462 transmits the signals PWMI and PWMC to the NPN transistors Q1 to Q6.

The ON/OFF states of the NPN transistors Q1 to Q6 are controlled based on the signals PWMI and PWMC. Likewise, the electric currents supplied to the respective phases of the AC motor M1 are controlled such that the AC motor M1 outputs the torque according to the torque command value TR. In this manner, the motor current MCRT is controlled, and the motor torque corresponding to the torque command value TR is output.

Figure 4:
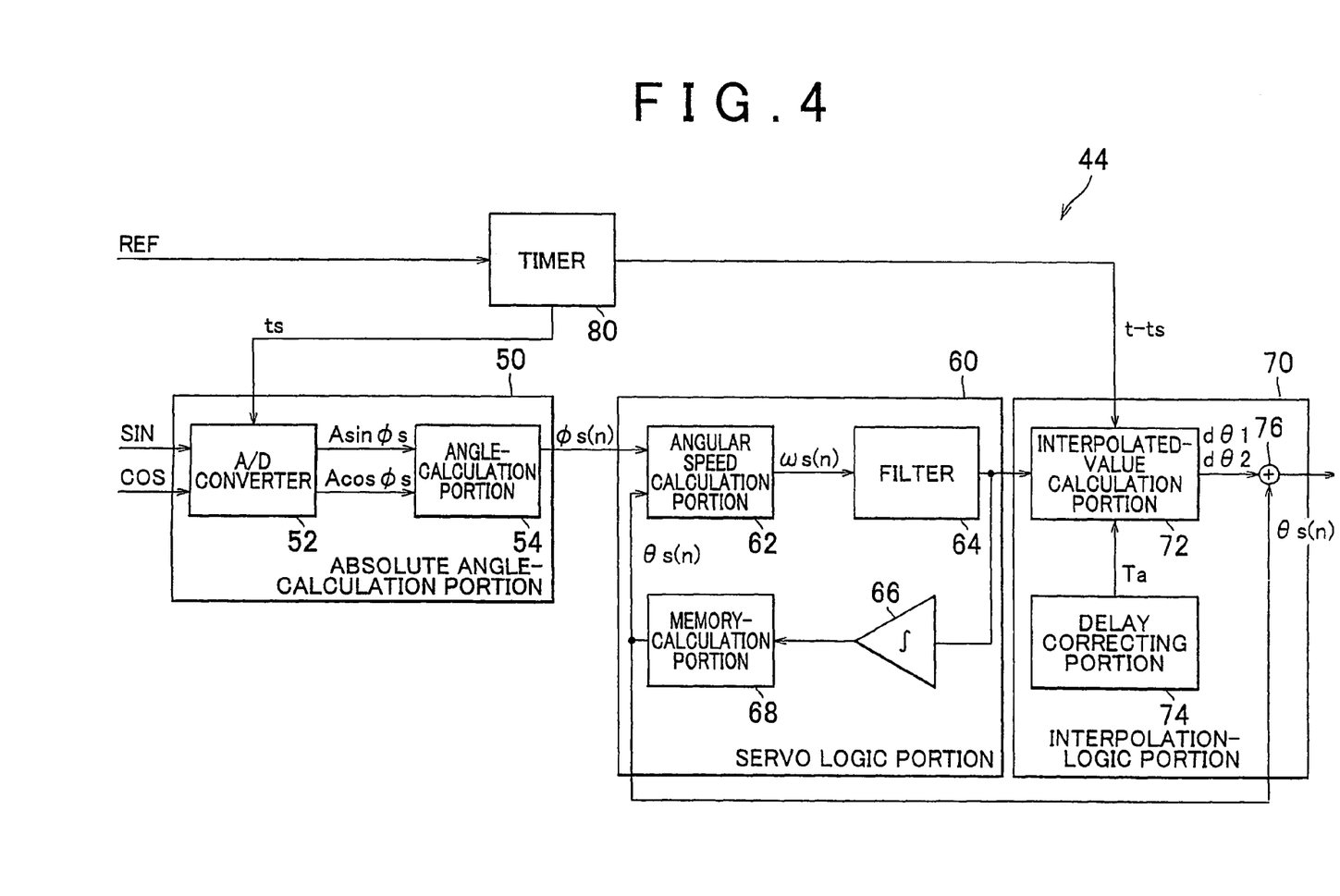
FIG. 4 illustrates the functional block diagram of a signal processing circuit included in the control unit in FIG. 2.

FIG. 4 illustrates the functional block diagram of the signal processing circuit 44 included in the control unit 40 in FIG. 2.

As described above, the signal processing circuit 44, and the resolver 30 and the oscillating circuit 42 in FIG. 2 constitute the "angular position detector" according to the invention.

As shown in FIG. 4, the signal processing circuit 44 includes an absolute angle-calculation portion 50, a servo logic portion 60, an interpolation-logic portion 70, and a timer 80.

The ideal reference signal REF and amplitude modulation signals (signals SIN and COS) of the resolver 30 are expressed by the following equations.

$$REF = E \times \sin(2\pi f \times t) \quad (1)$$

$$SIN = A \times \sin\theta \times \sin(2\pi f \times t) \quad (2)$$

$$COS = A \times \cos\theta \times \sin(2\pi f \times t) \quad (3)$$

In the above equations, each of "E" and "A" is the voltage transformation ratio of the voltage of the secondary coil to the voltage of the exciting coil, "θ" is the rotational angle of the rotor in the AC motor M1, and "f" is the frequency of the reference signal REF.

Figure 5A:
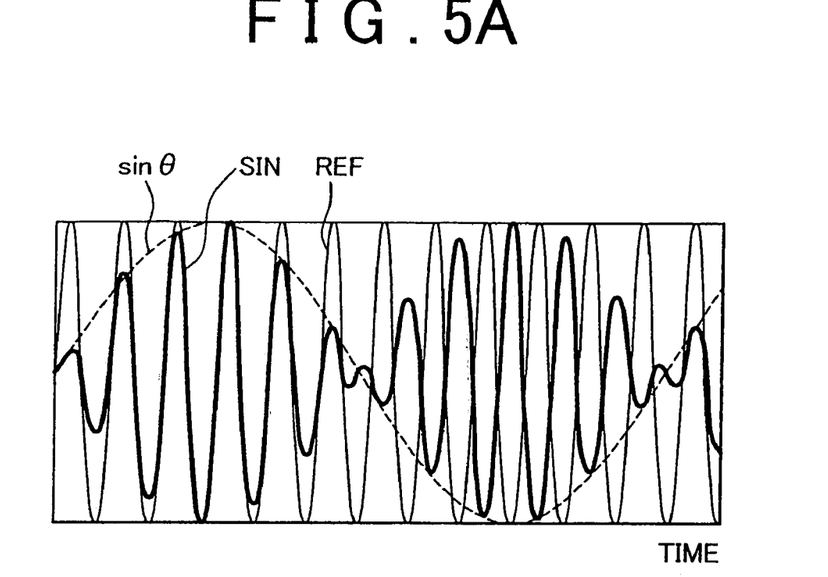
FIGS. 5A and 5B each illustrates output waveforms of a reference signal REF, an amplitude modulation signal output from a resolver, and the amplitude modulation signal with the excitation components removed, which is obtained after demodulation.
Figure 5B:
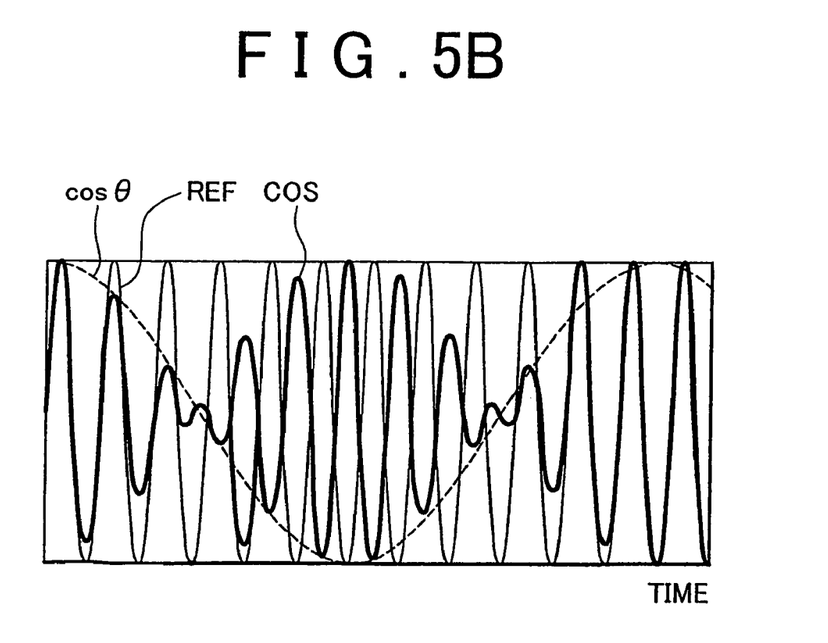

FIG. 5 illustrates output waveforms of the reference signal REF, the amplitude modulation signal output from the resolver 30, and the amplitude modulation signal with the excitation components removed, which is obtained after demodulation. More specifically, FIG. 5A illustrates the output waveforms of the signal SIN and the signal SIN after demodulation, and FIG. 5B illustrates the output waveforms of the signal COS and the signal COS after demodulation.

As shown in FIGS. 5A and 5B, the signals SIN and COS after demodulation can be expressed as follows.

$$SIN = A \times \sin\theta$$

$$COS = A \times \cos\theta$$

Also, the rotational angle θ of the rotor in the AC motor M1 can be derived according to the following equation using a tangent function (tan) that is the amplitude ratio between the signal SIN and the signal COS.

$$\theta = \tan^{-1}(\sin\theta/\cos\theta) \quad (4)$$

The basic function of the angular position detector according to the invention is to calculate the rotational angle θ of the rotor according to the equation (4) when the signal processing circuit 44 receives the amplitude modulation signal transmitted from the resolver 30. Because the calculation process that is conventionally performed by the R/D converter is simplified in the angular position detector according to the invention, the calculation process can be performed by the control unit 40.

As shown in FIG. 4, the absolute angle-calculation portion 50 includes an analog to digital converter (A/D converter) 52, and an angle-calculation portion 54. When receiving the amplitude modulation signals (signals SIN and COS) from the resolver 30 (not shown) and a timer value ts from the timer 80, the A/D converter 52 samples the signals SIN and COS at a predetermined frequency synchronous with the reference signal REF.

For example, in FIG. 5A and FIG. 5B, the signal SIN and the signal COS are sampled at each cycle of the reference signal REF. Thus, the signal SIN and the signal COS are converted into a digital signal A sin φs (n) and a digital signal A cos φs (n), respectively. Here, "A" indicates the amplitude of each of the signals SIN and COS, and "φs (n)" indicates the instantaneous value of the rotational angle of the rotor in the AC motor M1 at sampling time ts (n).

The A/D converter 52 transmits the digital signal A sin φs (n) and the digital signal A cos φs (n) to the angle-calculation portion 54. The angle-calculation portion 54 calculates the instantaneous value φs (n) of the rotational angle by substituting the digital signal A sin φs (n) and the digital signal A cos φs (n) into the above equation (4). The angle-computing portion 54 then transmits the instantaneous value φs (n) of the rotational angle to the servo logic portion 60.

Referring again to FIG. 4, the servo logic portion 60 includes an angular speed calculation portion 62, a filter portion 64, an integrator 66, and a memory-calculation portion 68.

The angular speed calculation portion 62 receives the instantaneous value φs (n) of the rotational angle from the angle-calculation portion 54 at each sampling time, and receives the servo-controlled rotational angle θs (n) from the memory-calculation portion 68 that will be described later in detail. The angular speed calculation portion 62 then calculates an angular speed ωs (n) at sampling time ts (n) using the instantaneous value φs (n) of the rotational angle and the rotational angle θs (n) according to the following equation (5).

$$\omega s(n) = \{\phi s(n) - \theta s(n-1)\}/\Delta ts \quad (5)$$

Here, "Δts" indicates a sampling interval (=ts (n)–ts (n–1)) in the A/D converter 52.

The noise components present in the angular speed ωs (n) are removed by the filter portion 64. The filtered angular speed ωs (n) is then transmitted to the integrator 66. The integrator 66 integrates the received angular speed ωs (n) at sampling intervals Δts. Due to such integration, an angle increase amount Δθs, which is an amount of increase in the rotational angle from the rotational angle θs (n–1) obtained at the immediately preceding sampling time ts (n–1), is obtained. The integrator 66 transmits the integral value to the memory-calculation portion 68.

The memory-calculation portion 68 calculates the rotational angle θs (n) at sampling time (n) based on the integral value transmitted from the integrator 66, and stores the rotational angle θs (n) in internal memory. More specifically, the memory-calculation portion 68 adds the angle increase amount Δθs, which is the integral value, to the rotational angle θs (n–1) at the immediately preceding sampling time ts (n–1) present in the storage region, and sets the rotational angle θs (n) at the current sampling time ts (n) to the value obtained by the addition (=θs (n–1)+Δθs). The memory-calculation portion 68 then updates the rotational angle θs from the rotational angle θs (n–1) present in the storage region to the rotational angle θs (n). In addition, the memory-calculation portion 68 outputs the rotational angle θs (n) to the angular speed calculation portion 62 and to an adder 76 of the interpolation-logic portion 70.

As described above, the servo logic portion 60 obtains the angular speed ωs at each sampling time ts based on the detected instantaneous value φs of the rotational angle, and obtains the rotational angle θs based on the angular speed ωs. Thus, it is possible to accurately obtain the rotational angle θs that changes with time.

This permits more efficient suppression of noise in comparison to the conventionally used R/D converter. Namely, the R/D converter is controlled in a feedback manner such that the sine-wave function sin(θs–φs) of the phase difference between the rotational angle θs and the instantaneous value φs of the rotational angle is zero. This causes a problem that a feedback gain disperses, causing noise, because the rotational angle θ is fixed to a value that differs from the instantaneous value φs by the phase difference of 180 degrees. In contrast, the servo logic portion 60 can be controlled in a feedback manner at the gain proportional to the phase difference between the rotational angle θs and the instantaneous value φs of the rotational angle. As a result, noise can be minimized.

In addition, the computation process can be drastically simplified as compared with the conventionally used angular position detector having the function of the R/D converter. This produces the effect that the computation load placed on the microcomputer due to computation can be minimized.

Next, the rotational angle θs (n) obtained by the servo logic portion 60 is transmitted to the interpolation-logic portion 70, as shown in FIG. 4. As described below, the interpolation-logic portion 70 includes interpolation means for interpolating the rotational angle θ between the rotational angles θs (n) discretely detected at sampling times ts (n), and delay correcting means for correcting the deviation of the time point at which the detected value is output from the time point at which the actual value of the rotational angle θ is obtained, which occurs in the servo logic portion 60. Because these means are provided along with the servo logic portion 60, the angular position detector according to the invention can accurately detect the rotational angle θ at appropriate time, even when the rotary electric device runs at a high speed.

First, the interpolation means for interpolating the rotational angle θ between the rotational angles θs (n) will be described.

Figure 6:
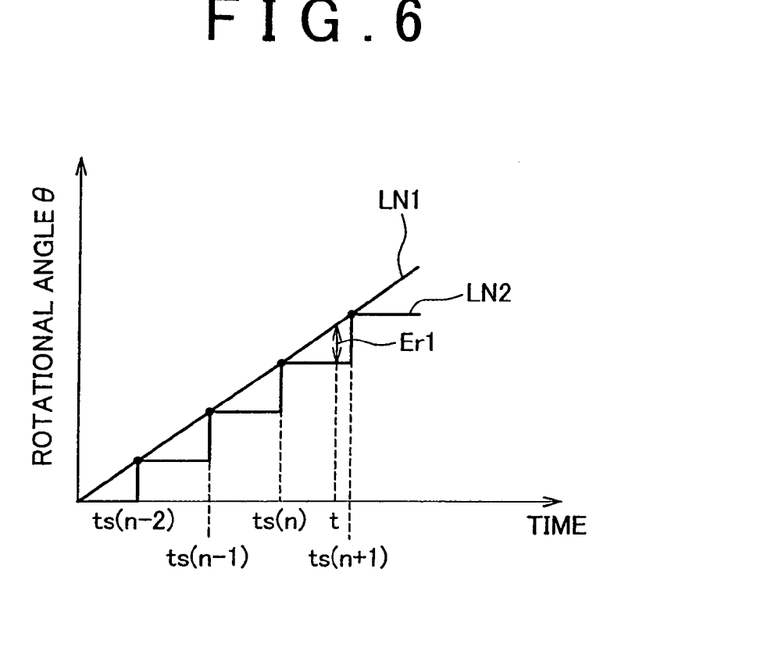
FIG. 6 illustrates the graph showing an output waveform of a rotational angle θs (n), which is output from a servo logic portion.

FIG. 6 illustrates the graph showing the output waveform of the rotational angle θs (n) output from the servo logic portion 60.

As shown in FIG. 6, the rotational angle θs (n) output from the servo logic portion 60 is the discrete data present at each sampling time ts, and exhibits the stepwise output waveform indicated by the stepwise line LN2 in FIG. 6. These discrete data are consolidated on the straight line LN1 having a slope proportional to the speed of the AC motor M1. Namely, it is estimated that the rotational angle θ actually detected by the resolver 30 will exhibit a change with time according to the straight line LN1.

For example, at time t which is between sampling time ts (n) and sampling time ts (n+1), there is the angular difference indicated by an arrow Er1 between the rotational angle θ at the time t obtained according to the stepwise line LN2 and the rotational angle θ at time t obtained according to the straight line LN1. This means that the rotational angle θ output from the servo logic portion 60 deviates from the rotational angle θ actually detected by the resolver 30 by the angular difference indicated by the arrow Er1. The slope of the straight line LN1 increases as the motor speed of the AC motor M1 increases. The deviation further increases as the speed of the AC motor M1 increases.

To minimize such deviation, the sampling frequency of the A/D converter 52 may be increased, thereby performing sampling more frequently. However, because the frequency of the reference signal REF that can be produced by the oscillating circuit 42 and the processing power of the microcomputer that constitutes the control unit 40 are limited, there is a limit as to the extent to which the sampling frequency can be increased.

Accordingly, the invention makes it possible to interpolate the rotational angle θ between the rotational angles θs (n) at sampling times ts (n), and obtain the accurate rotational angle θ at appropriate time t according to the method described below.

Figure 7:
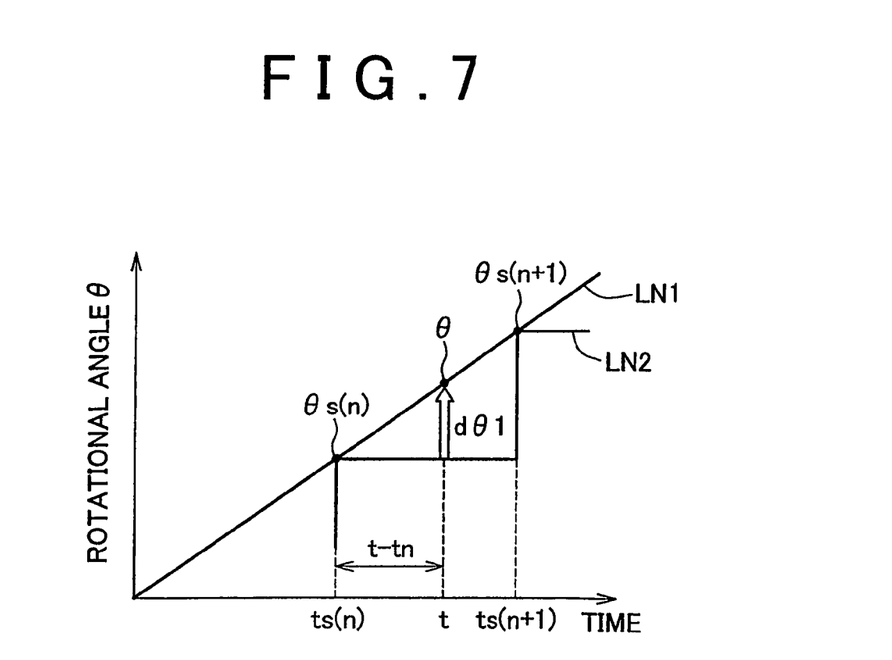
FIG. 7 illustrates the graph for describing interpolation means included in an interpolation-logic portion in FIG. 4.

FIG. 7 is used to describe the interpolation means included in the interpolation-logic portion 70 in FIG. 4. As shown in FIG. 7, the rotational angle θ at time t is obtained based on the contiguous data (corresponding to the straight line LN1) that is estimated based on the discrete data (corresponding to the stepwise line LN2) output from the servo logic portion 60.

More specifically, because the angular speed ωs (n) calculated by the servo logic portion 60 corresponds to the slope of the straight line LN1 at sampling time ts (n), an amount of change dθ1 in the rotational angle (hereinafter, referred to as "angle change amount dθ1") from the rotational angle θs (n) is calculated based on the angular speed ωs (n) and the elapsed time t−ts (n), which is the time that has elapsed since sampling time ts (n) until the time t. Then, as expressed by the following equation (6), the rotational angle θ is obtained by adding the calculated angle change amount dθ1 to the rotational angle θs (n).

$$\theta = \theta s(n) + d\theta 1 = \theta s(n) + \omega s(n) \times (t-ts) \qquad (6)$$

An interpolated-value calculation portion 72 and the adder 76 in the interpolation-logic portion 70, and the timer 80 constitute the above-mentioned interpolation means in the signal processing circuit 44 in FIG. 4. When an instruction to obtain the rotational angle θ is issued at time t, the timer 80 calculates the elapsed time t−ts (n) that has elapsed since the immediately preceding sampling time ts (n), and outputs it to the interpolated-value calculation portion 72. When receiving the angular speed ωs (n) from the filter portion 64 and the elapsed time t−ts (n) from the timer 80, the interpolated-value calculation portion 72 calculates the angle change amount dθ1 in the above-described manner, and outputs it to the adder 76. The adder 76 calculates the rotational angle θ by adding the angle change amount dθ1 to the rotational angle θs (n) transmitted from the memory-calculation portion 68, and transmits it to the inverter control circuit 46 (not shown).

Although the rotational angle θ can be detected by the interpolation means at the appropriate time, the detected rotational angle θ lags the actual rotational angle of the AC motor M1 due to the feedback control of the servo logic portion 60. As such, the response is somewhat delayed. Accordingly, in addition to the interpolation process, a correction process for correcting the delay in response is performed on the rotational angle θs (n) to minimize the delay in response.

Next, the correcting means for correcting the deviation of the time point at which the rotational angle is output from the time point at which the actual rotational angle is obtained, which occurs in the servo logic portion 60.

Figure 8:
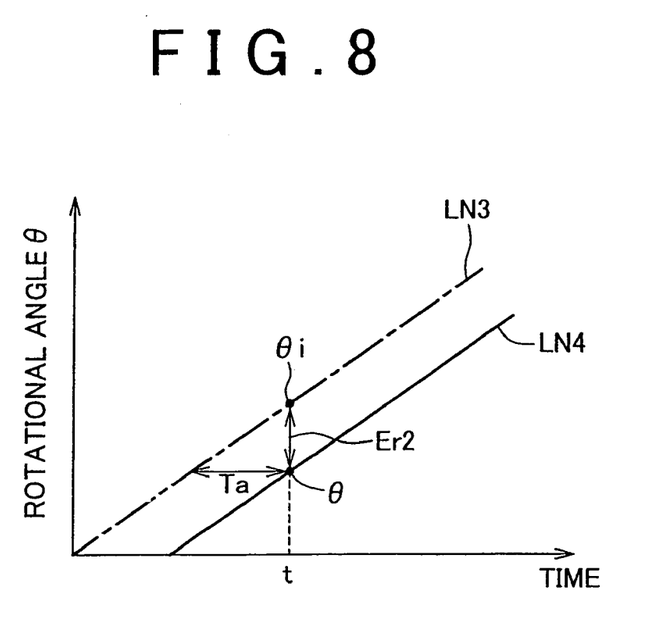
FIG. 8 illustrates the graph showing an output waveform of the rotational angle θ, which is output from the servo logic portion.
Figure 9:
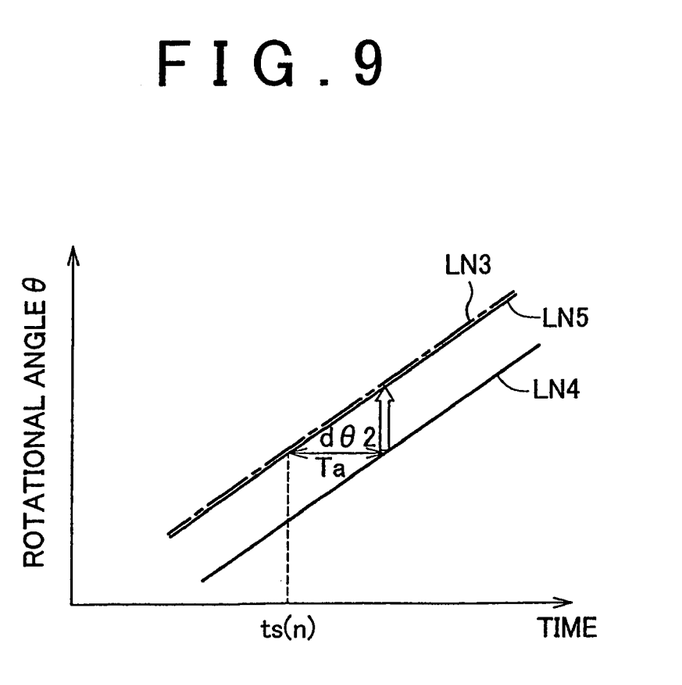
FIG. 9 illustrates the graph for describing delay correcting means included in the interpolation-logic portion in FIG. 8.

FIG. 8 illustrates the graph showing the output waveform of the rotational angle θ output from the servo logic portion 60. In FIG. 8, the straight line LN4 indicates the output waveform of the rotational angle θ obtained after interpolating process is performed on the rotational angle θs (n) by the interpolation means. Meanwhile, the straight line LN3 indicates the output waveform of the actual rotational angle θi of the AC motor M1.

As shown in FIG. 8, the straight line LN4 is substantially parallel to the straight line LN3 with a predetermined time deviation Ta. Namely, although the rotational angle θ changes in accordance with the change in the actual rotational angle θi of the AC motor M1, the rotational angle θ is always output with a predetermined time lag Ta. Such a delay in response appears as a difference in the rotational angle indicated by the arrow Er2 when the rotational angle θ and the rotational angle θi are compared with each other at given time t. Namely, the rotational angle θ always appears to deviate from the rotational angle θi by an amount corresponding to deviation of the time point at which the rotational angle θ from the time point at which the rotational angle θi is obtained.

Accordingly, the delay correcting means according to the invention shifts the entire straight line LN4 only by the angle change amount dθ2 such that the straight line LN4 matches the straight line LN5. Thus, because the straight line LN5 substantially matches the straight line LN3, the deviation of the rotational angle θ from the rotational angle θi can be eliminated.

The angular speed ωs (n) calculated by the servo logic portion 60 corresponds to the slope of the straight line LN4 at sampling time ts (n). Accordingly, the angle change amount dθ2 can be calculated by multiplying the angular speed ωs (n) by the predetermined time Ta.

The interpolated-value calculation portion 72, a delay correcting portion 74, and the adder 76 in the interpolation-logic portion 70 constitute the delay correcting means in the signal processing circuit 44 in FIG. 4. More specifically, the predetermined time Ta is a value specific to the servo logic portion 60, and stored in advance as a delay correction constant Ta in the delay correcting portion 74. When an instruction to obtain the rotational angle θ is issued at time t, the delay correcting portion 74 transmits the delay correction constant Ta to the interpolated-value calculation portion 72. The interpolated-value calculation portion 72 calculates the angle change amount dθ2 using the angular speed ωs (n) from the filter portion 64 and the delay correction constant Ta from the delay correcting portion 74. The angle change amount dθ2 is calculated according to the method described above, and transmitted to the adder 76. Once the adder 76 receives the angle change amount dθ2 from the interpolated-value calculation portion 72 and the angle change amount dθ1 described above, the adder 76 adds the angle change amounts dθ1, dθ2 and the rotational angle θs (n) to determine the final rotational angle θs (n). The adder 76 then transmits the calculated rotational angle θ to the inverter control circuit 46 (not shown).

With such configuration, the inverter control circuit 46 is provided with the rotational angle θ that accurately matches the actual rotational angle θi of the rotor in the AC motor M1. As a result, the motor drive unit according to the invention can appropriately drive the AC motor M1 even when the AC motor M1 runs at a high speed.

Figure 10:
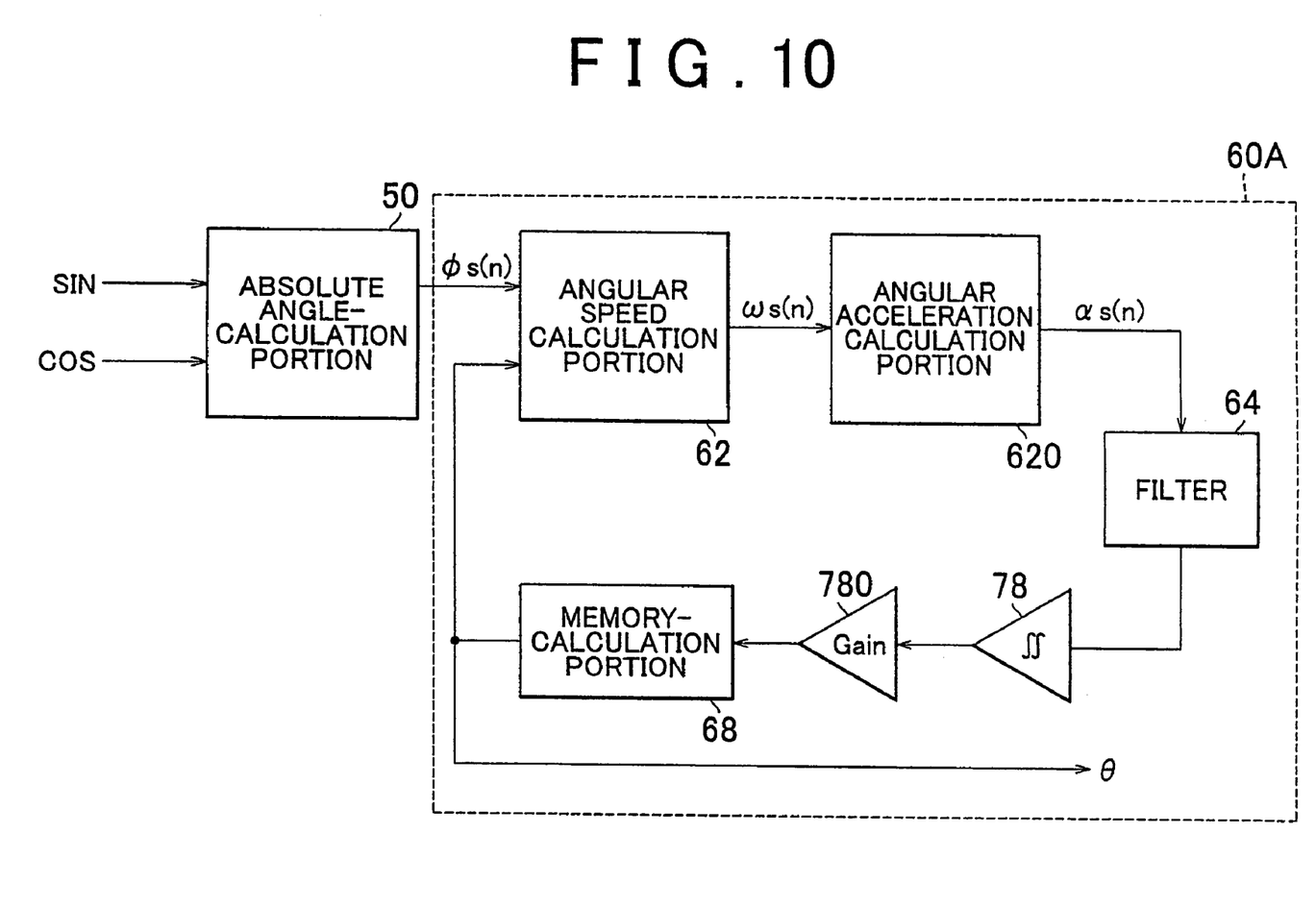
FIG. 10 illustrates the functional block diagram showing interpolation means and delay correcting means having another configuration.

An example of the interpolation means and the delay correcting means is shown in FIG. 10. Unlike the case shown in FIG. 4, the configuration is such that the servo logic portion is not provided with the interpolation-logic portion 70, and a servo logic portion 60A shown in FIG. 10 is employed.

More specifically, the servo logic portion 60A calculates the angular acceleration αs (n) by further differentiating the angular speed ωs (n) calculated based on the instantaneous value φs (n) of the rotational angle by using an angular acceleration calculation portion 620. The servo logic portion 60A integrates the calculated angular acceleration αs (n) twice by using an integrator 78, increases the gain of the integrator by using a variable gainer 780, and outputs it to the memory-calculation portion 68. Thus, it is possible accurately detect the rotational angle θ and obtain high response due to the introduction of the derivative term and an increase in the gain.

However, in the servo logic portion 60A, unnecessary noise is also amplified due to an increase in the feedback gain, which results in instability in the feedback control. Also, because the load placed on the microcomputer is increased by introducing the derivative term, a microcomputer having higher computation ability is required, resulting in an increase in cost.

In contrast, according to the invention, the interpolation-logic portion 70 interpolates the rotational angle θ at the given time between the rotational angles θs (n) at the consecutive sampling times ts (n) using the angular speed ωs (n) output from the servo logic portion 60 to compensate for the response delay. Accordingly, it is not necessary to increase the feedback gain, and stable feedback control can be performed in the servo logic portion 60. In addition, because the increase in the load placed on the microcomputer is suppressed, the cost can be reduced.

Figure 11:
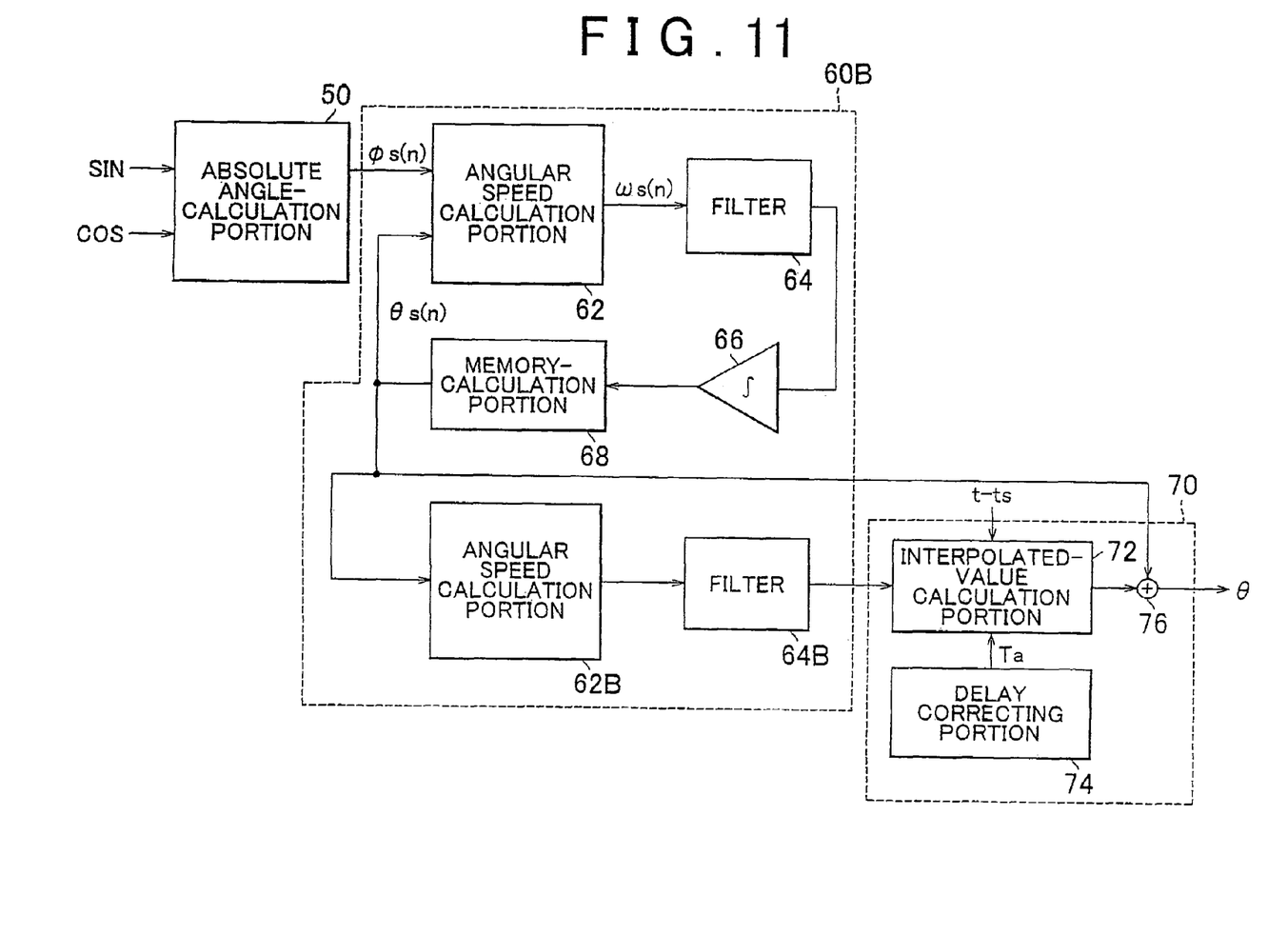
FIG. 11 illustrates the functional block diagram showing the interpolation means and delay correcting means having another configuration.

FIG. 11 shows an example of an alternative configuration including the interpolation-logic portion 70. A servo logic portion 60B converts the rotational angle θs (n) to the angular speed using the angular speed calculation portion 62B and a filter portion 64B again, and transmits the angular speed to the interpolation-logic portion 70.

Because the interpolation-logic portion 70 in this configuration interpolates the rotational angle θ at the given time between the rotational angles θs (n) at the consecutive sampling times ts (n) and corrects response delay based on the angular speed transmitted from the servo logic portion 60B, the rotational angle θ can be accurately detected and high response is achieved, as in the case shown in FIG. 4. However, due to the inclusion of a calculation means, which calculates the angular speed from the rotational angle θs (n), in the servo logic portion 60B, the load placed on the microcomputer is considerably increased.

In contrast, with the configuration shown in FIG. 4, the servo logic portion 60 directly supplies the angular speed ωs (n) obtained by the feedback control to the interpolation-logic portion 70, and the interpolation-logic portion 70 interpolates the rotational angle θ at the given time between the rotational angles at the consecutive sampling times ts and corrects the delay in response using the angular speed ωs (n). Accordingly, an increase in the load placed on the microcomputer can be minimized, and the cost for producing the angular position detector can be further reduced.

Figure 12:
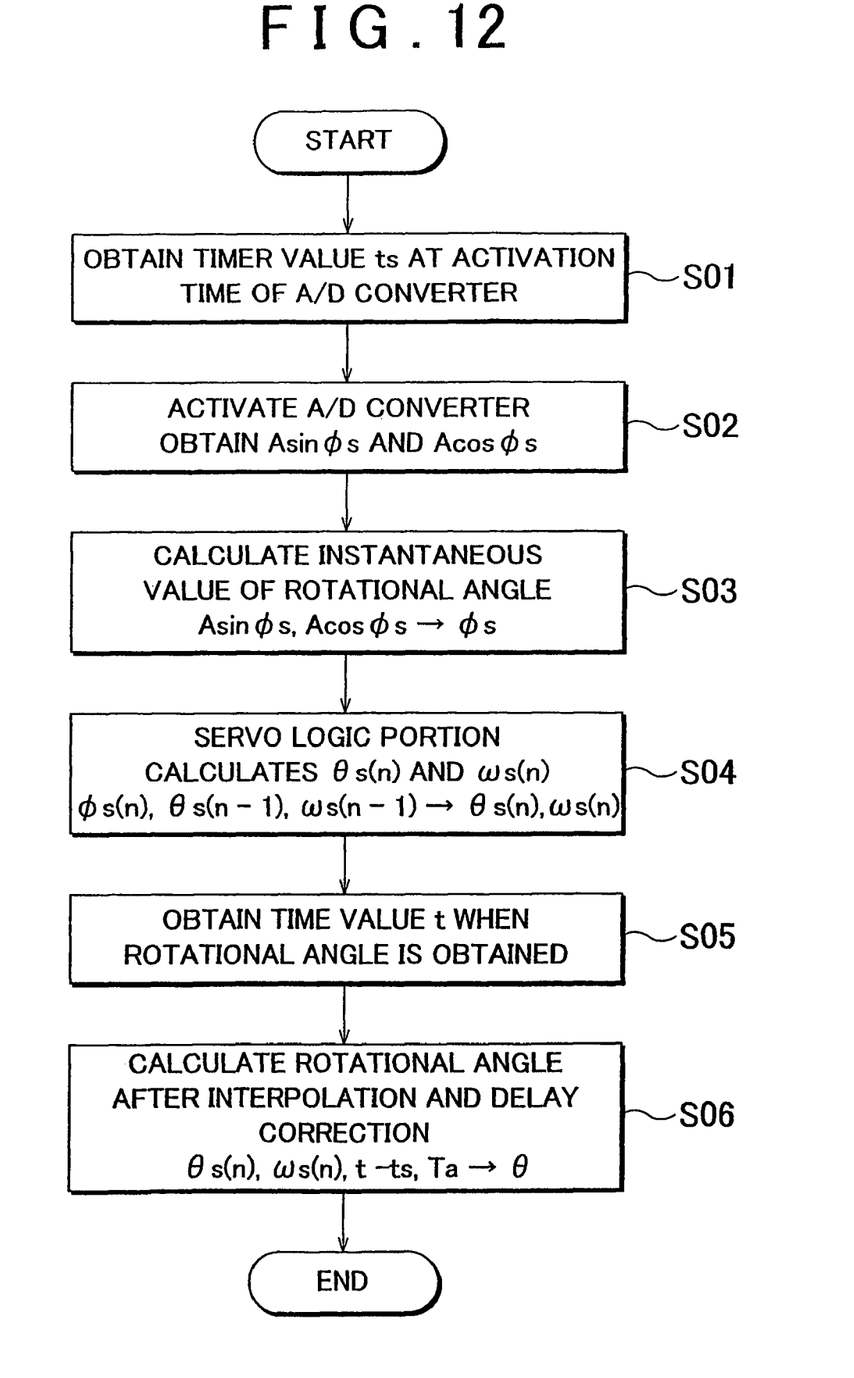
FIG. 12 illustrates the flowchart of the rotational angle detecting routine performed by the angular position detector according to the embodiment of the invention.

FIG. 12 illustrates the flowchart for describing the rotational angle detection routine performed by the angular position detector according to the invention.

As shown in FIG. 12, when the routine commences, the A/D converter 52 of the absolute angle-calculation portion 50 is activated. At this time, the A/D converter 52 obtains the timer value ts from the timer 80 that always operates in synchronization with the reference signal REF having a predetermined frequency (step S01).

After receiving the amplitude modulation signals (signals SIN and COS) from the resolver 30, the A/D converter 52 samples the signals SIN and COS when it receives the timer value ts transmitted from the timer 80 (step S02). Thus, the signals SIN and COS are sampled at time synchronous with the reference signal REF, and converted into the digital signals A sin φs (n) and A cos φs (n), respectively. The A/D converter 52 transmits the digital signals A sin φs (n) and A cos φs (n) to the angle-calculation portion 54.

The angle-calculation portion 54 calculates the instantaneous value φs (n) of the rotational angle using the digital signals A sin φs (n) and A cos φs (n) (step S03). Then, the angle-calculation portion 54 transmits the instantaneous value φs (n) of the rotational angle to the servo logic portion 60.

The servo logic portion 60 uses the instantaneous value φs (n) of the rotational angle, the rotational angle θs (n−1) and the angular speed ωs (n−1) at the immediately preceding sampling time ts (n−1) to calculate the rotational angle θs (n) and the angular speed ωs (n) at the current sampling time ts (n) (step S04). The servo logic portion 60 transmits the rotational angle θs (n) and the angular speed ωs (n) to the interpolation-logic portion 70.

After receiving the rotational angle θs (n) at each sampling time ts (n), the interpolation-logic portion 70 interpolates the rotational angle θ at the given time between the rotational angles θs (n) at the consecutive sampling times ts according to the manner described above. More specifically, the timer 80 obtains the elapsed time t−ts (n) that has elapsed since the immediately preceding sampling time ts until the time t at which an instruction to obtain the rotational angle θ is issued. The timer 80 then transmits the elapsed time t−ts (n) to the interpolated-value calculation portion 72. The interpolated-value calculation portion 72 calculates the angle change amount dθ1, and transmits it to the adder 76.

In addition, the interpolated-value calculation portion 72 calculates the angle change amount dθ2, and transmits it to the adder 76. After receiving the angle change amounts dθ1 and dθ2 from the interpolated-value calculation portion 72, and the rotational angle θs (n) from the memory-calculation portion 68, the adder 76 transmits the total sum of the values as the rotational angle θ at time t to the inverter control circuit (step S06).

As described above, according to the invention, it is possible to accurately detect the angular position of the rotor in the A/C motor even when the A/C motor runs at a high speed. Also, because the process of calculating the rotational angle is simplified, the reduced load is placed on the microcomputer, and the cost for producing the angular position detector can be reduced. Namely, the angular position detector according to the invention can be configured at low cost, and can accurately detect the angular position of the rotor in the A/C motor even when the A/C motor runs at a high speed.

The invention can be applied to angular position detectors that detect the angular position of a rotor in a motor, and motor drive units in which such angular position detectors are included.

While the invention has been described with reference to exemplary embodiments thereof, is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An angular position detector that detects an angular position of a rotor included in a rotary electric device, comprising:
   a resolver that outputs a signal indicating a rotational angle of the rotor; and
   a signal processing circuit that calculates the rotational angle of the rotor based on the signal output from the resolver, and outputs the signal indicating the rotational angle, wherein
   the signal processing circuit includes:
   sampling device to sample the signal output from the resolver at predetermined intervals, and convert the signal into a digital signal;
   absolute angle calculation circuit to calculate an instantaneous value of the rotational angle at sampling time, at which the signal output from the resolver is sampled, based on the digital signal;
   angular speed calculation circuit to calculate an angular speed at the sampling time based on the instantaneous value of the rotational angle; and
   rotational angle calculation circuit to convert the angular speed into a temporal change in the rotational angle, and for calculating the rotational angle at the sampling time, which accurately matches an actual rotational angle that changes with time.

2. The angular position detector according to claim 1, wherein
the rotational angle calculation circuit feeds the rotational angle at the sampling time back to the angular speed calculation circuit;
the angular speed calculation circuit calculates the angular speed at the sampling time based on the feed back rotational angle at the sampling time and the instantaneous value of the rotational angle; and
the signal processing circuit further includes a delay correcting circuit to accurately calculate the rotational angle at the sampling time by correcting a delay in output of the rotational angle that occurs due to the feedback.

3. The angular position detector according to claim 2, wherein
the delay correcting circuit stores a predicted magnitude of delay due to the feedback as a delay correction constant, and adds a corrected angle calculated based on the delay correction constant and the angular speed at the sampling time to the rotational angle at the sampling time.

4. The angular position detector according to claim 3, wherein
the signal processing circuit further includes an interpolation circuit to interpolate the rotational angle at a given time between the rotational angles at consecutive sampling times using the angular speed at the sampling time, and outputting the interpolated rotational angle.

5. The angular position detector according to claim 4, wherein
the interpolation circuit interpolates the rotational angle at the given time between the rotational angles at the consecutive sampling times using the angular speed calculated by the angular speed calculation circuit as the angular speed at the sampling time, and outputs the interpolated rotational angle.

6. A rotary electric device drive unit, comprising:
a power supply;
a drive circuit that drives a rotary electric device using electric power supplied from the power supply; and
a control unit that includes the angular position detector according to claim 1, and that controls the drive circuit based on an angular position of a rotor in the rotary electric device.

* * * * *